United States Patent Office 3,415,881
Patented Dec. 10, 1968

3,415,881
METHOD OF PRODUCTION OF
MONOCYCLOHEXYLAMINE
Andrew P. Dunlop, Riverside, Donald G. Manly, Barrington, and Fred J. Rice, Jr., Carpentersville, Ill., assignors to The Quaker Oats Company, Chicago, Ill., a corporation of New Jersey
No Drawing. Continuation of application Ser. No. 390,222, Aug. 17, 1964. This application Dec. 18, 1967, Ser. No. 691,649
5 Claims. (Cl. 260—563)

ABSTRACT OF THE DISCLOSURE

Monocyclohexylamine is produced by reacting cyclohexanone with ammonia and hydrogen in an ammonia-hydrogen gas mixture and in the presence of a hydrogenation catalyst and dicyclohexylamine.

This is a continuation of Ser. No. 390,222, filed Aug. 17, 1964, now abandoned.

This invention relates to a method for the production of monocyclohexylamine. More particularly, it relates to the conversion of cyclohexanone to monocyclohexylamine.

Recent technological developments in the production of cyclohexanone have made this ketone potentially attractive as a raw material for the production of cyclohexylamine. A raw material which is now potentially very attractive is a mixture of cyclohexanol and cyclohexanone which has recently become available. However, there has not been a satisfactory method for the commercial reductive amination of cyclohexanone to cyclohexylamine. Of the five routes to cyclohexylamine which are listed in the text by Wagner and Zook, Synthetic Organic Chemistry, John Wiley and Sons, Inc., New York, page 684, the best yields reported are those obtained by the hydrogenation of an unsaturated aromatic amine, specifically aniline (94% yield), and the worst yield reported was that obtained by the reductive amination of cyclohexanone (using Raney nickel; 50% yield).

An object of this invention is provide a method for the production of cyclohexylamine using cyclohexanone as a raw material. Another object of this invention is to provide a method for producing monocyclohexylamine in improved yields based on the cyclohexanone converted. A further object of this invention is to provide a method which produces improved yields of monocyclohexylamine from cyclohexanone when the ketone is present in a mixture of cyclohexanone and cyclohexanol. An object of this invention is to provide a method by which cyclohexanone is converted directly to cyclohexylamine without requiring separate conversion to material more amenable to conversion to cyclohexylamine. A further object of this invention is to provide a method for converting cyclohexanone to cyclohexylamine by which substantially no tricyclohexylamine is formed.

These and other objects which will be apparent hereinafter we accomplished in accordance with this invention by a method comprising contacting cyclohexanone vapor with a stoichiometric excess of ammonia and hydrogen in an ammonia-hydrogen gas mixture, said contacting taking place in the presence of a specially prepared nickel catalyst at a temperature below about 230° C. and at a pressure between about 1 atmosphere and about 8 atmospheres, said specially prepared nickel catalyst having been reduced at a temperature below about 450° C., reoxidized by passing a gas containing free oxygen over the reduced catalyst and again reduced by passing a gas thereover containing free hydrogen at a temperature below about 250° C. The specially prepared nickel catalyst employed in the process of this invention is a nickel catalyst, e.g., nickel hydrate which has been reduced at a temperature below about 450° C., reoxidized by passing a gas containing free oxygen over the reduced catalyst, preferably until the ratio of reduced nickel to total nickel is between about 55% and about 65%. At this point a preferred catalyst contains about 58% total nickel. The final reduction of the specially prepared nickel catalyst can then be accomplished in an eminently satisfactory manner by passing a gas thereover initially containing about 5% hydrogen and about 95% nitrogen and thereafter progressively increasing the hydrogen content of the final reduction gas to 100% so that the temperature of the latter reduction step is maintained below about 250° C. In an alternative preferred procedure, the final reduction of the specially prepared nickel catalyst is accomplished by contacting therewith pure hydrogen gas, the initial contacting temperature being about 140° C., maintaining the temperature below about 250° C. The specially prepared nickel catalyst may be used as such, or it may be supported on any suitable support such as kieselguhr, alumina, pumice, alundum, charcoal, or the various natural or synthetic clay-like supports that are well known to the art. In addition, the specially prepared catalyst composition may be modified if desired to incorporate certain basic substances or promotors, such as sodium silicate, calcium oxide, magnesium oxide, zirconium oxide, or the like.

The pressures employed in accordance with this invention during the contacting of the cyclohexanone, ammonia, and hydrogen in the presence of the special catalyst of this invention are atmospheric or near atmospheric pressures. Pressures below about 8 atmospheres are eminently satisfactory, though pressures between about 2 and about 5 atmospheres are preferred.

The temperature for contacting the special catalyst with cyclohexanone, ammonia, and hydrogen in a preferred embodiment of this invention is between about 130° C. and about 180° C. Contacting temperatures substantially in excess of about 230° C. lead to the formation of excessive quantities of decomposition products such as cyclohexane.

We know of no true lower temperature limit however, and the practical lower operating temperature is governed primarily by economically acceptable rates of conversion. Below about 100° C. the rate of conversion is comparatively slow. Hence, in accordance with this invention we prefer to employ temperatures above about 100° C. and below about 230° C., and it is more preferable to employ temperatures between about 130° C. and about 180° C.

Hence, for each operating temperature there is a certain feed rate above which conversion will begin to drop below about 100%. Therefore, if less than quantitative conversion is obtained under a specific set of conditions either raising the temperature or lowering the feed rate will facilitate achievement of complete conversion. At 100° C. about 0.1 pound of feed per pound of specially prepared nickel catalyst per hour can generally be completely converted in accordance with this invention. At about 130° C. the upper feed rate for 100% conversion is about 0.3 pounds per pound per hour and it is about twice that rate at about 200° C. It is to be understood that these feed rates are not actually operative limits and higher feed rates can be employed without departing from this invention. There is no nonoperative lower limit on the feed rate at any temperature.

Generally speaking, higher recycle rates and higher levels of ammonia in the ammonia-hydrogen gas mixture lead to lower conversion to dicyclohexylamine. Ammonia-hydrogen gas mixtures containing ammonia in an amount between about 20 mole percent and about 90 mole percent based on the number of moles of said gas mixture are eminently satisfactory for use in accordance with this invention. Ammonia-hydrogen gas mixtures containing about 50 to about 90 mole percent ammonia on the same basis are preferred.

Hydrogen make-up gas and ammonia make-up gas are normally added to the recycling excess gas mixture leaving the product tank, and the replenished gas mixture is passed through the vaporizer and on to the reactor catalyst bed. As used herein, the terms "recycle ratio" and "recycle rate" refer to the ratio representing the number of moles of ammonia-hydrogen gas mixture per mole of feed which is present in the gas-feed mixture immediately before the reactants contact the catalyst bed. When cyclohexanone is the feed, the recycle rate is calculated on the basis of moles of cyclohexanone fed, whereas when a mixture of cyclohexanone-cyclohexanol is used as the feed, the recycle rate is calculated on the basis of the total moles of feed. In accordance with this invention recycle ratios between about 10 and 100 are eminently satisfactory, while those between about 30 and about 90 are preferred.

It is preferred that the condenser and product tank be so adapted that the gas mixture leaving the product tank contain a minimum amount of materials other than ammonia and hydrogen. While the stoichiometric excess of the ammonia-hydrogen gas mixture is recycled over the bed in the normal practice of this invention, the feed materials, e.g., cyclo-hexanone, are normally completely converted in a single pass over the catalyst bed.

A more preferred embodiment of this invention comprises contacting cyclohexanone, dicyclohexylamine, and a stoichiometric excess of ammonia and hydrogen in the presence of the specially prepared nickel catalyst described above and at the temperatures and pressures described above. The amount of the dicyclohexylamine present with the cyclohexanone feed is preferably approximately the same as the amount of dicyclohexylamine in the degassed, dried, crude reaction product obtained from the reactor. Hence, if the crude reaction mixture is found to contain approximately 80% of monocyclohexylamine and 10% dicyclohexylamine by weight, based on the weight of the degassed, dried, crude product, this amount (i.e., 10% by weight based on the weight of the feed) of dicyclohexylamine is added to the cyclohexanone-containing feed in accordance with the more preferred embodiments of this invention. However, it is not essential that the feed contain the same amount of dicyclohexylamine as the product. Dicyclohexylamine in the feed in amounts between about 5% and about 25% by weight based on the weight of the feed are generally useful, though larger or smaller amounts are also useful. In most cases an amount between about 5% and about 15% is preferred.

The inclusion of the dicyclohexylamine in the feed material has been found to inhibit formation of more dicyclohexylamine from the feed materials. In a particular case in which the crude product is found to contain 80% monocyclohexylamine and 10% dicyclohexylamine, the inclusion of approximately 10% dicyclohexylamine with the feed surprisingly alters the direction of the conversion of the feed so that the yield of monocyclohexylamine is increased from about 80% based on the cyclohexanone converted to approximately 90% on the same basis, while conversion of the feed to dicyclohexylamine is substantially suppressed.

We have found that this surprising suppression of the conversion of cyclohexanone to dicyclohexylamine due to the presence of dicyclohexylamine is achieved whether the specially prepared nickel catalyst of this invention is employed or whether any of the less efficient reductive amination catalysts of the prior art, such as Raney nickel, are employed, or whether the catalysts of Group VIII, such as palladium or rhodium, are employed, as taught herein. Hence, we have also discovered a method for obtaining improved yields of monocyclohexylamine comprising contacting cyclohexanone vapor with a stoichiometric excess of ammonia and hydrogen in an ammonia-hydrogen gas mixture, said contacting taking place in the presence of a hydrogenation catalyst such as those of Group VIII, preferably palladium or rhodium, more preferably the special nickel catalyst described herein, said contacting also taking place in the presence of dicyclohexylamine in an amount substantially equal to the amount of dicyclohexylamine in the crude product produced by said process, said contacting furthermore taking place at a temperature below about 230° C., and at a pressure between about 1 atmosphere and about 8 atmospheres, preferably between about 2 and about 5 atmospheres.

For example, in one pair of tests, 10 parts of feed per part of rhodium per hour was fed in the vapor phase over a 0.5% rhodium-on-alumina catalyst. The feed was in an ammonia-hydrogen gas mixture containing 70 mole percent ammonia. The contacting temperature was 100° C. and the recycle ratio, as defined above, was 40 to 1. In a run in which the feed was cyclohexanone only, 100% conversion of the feed led to 80% yield of monocyclohexylamine, and 8% dicyclohexylamine. In another test, identical except that the feed was 90% cyclohexanone with 10% dicyclohexylamine, 100% conversion of the cyclohexanone led to 88% yield of monocyclohexylamine with 0.1% yield of dicyclohexylamine.

In another pair of tests, 17 parts of feed per part of palladium was fed in the vapor phase over a 0.3% palladium-on-alumina catalyst. The feed was in an ammonia-hydrogen gas mixture containing 65 mole percent ammonia, the contacting temperature was 150° C., and the recycle ratio, as defined above, was 43 to 1. In a test in which the feed was cyclohexanone alone, 100% conversion led to 72% yield of monocyclohexylamine and 9% yield of dicyclohexylamine. In the duplicate run, identical except that the feed contained 90% cyclohexanone, and 10% dicyclohexylamine, 100% conversion of the cyclohexanone led to 77% monocyclohexylamine and no dicyclohexylamine.

Use of dicyclohexylamine in conjunction with the special nickel catalyst of this invention is illustrated further in the numbered examples. The preferred temperatures, pressures, recycle ratios, gas mixture compositions, and other preferred operating variables will vary somewhat for other catalysts of Group VIII from those taught above for use with the special nickel catalyst of this invention, when these catalysts are used with dicyclohexylamine as taught herein.

The invention will be further illustrated but is not limited by the following examples in which the quantities are stated in parts by weight unless otherwise indicated, in which the percent yields refer to mole percent of the converted feed which was converted to that particular product, and in which yields are based on product analyses which were obtained by vapor phase chromatography of the benzene solution remaining after removal of the water by azeotropic distillation of an aliquot of the crude product in benzene.

Example 1

A specially prepared nickel catalyst for use in the process of this invention was prepared and stabilized by the following procedure. Unreduced nickel oxide kieselguhr tablets were loaded into a vertical jacketed reactor tube. The system was purged with nitrogen and brought to about 260° C. by means of recirculating oil in the reactor jacket. Hydrogen flow was started and the temperature of the bed was gradually increased to about 427° C. The hydrogen-nitrogen mixture coming from the reactor tube passed through a condenser hermetically joined therewith and by way of a product drop-out tank and a recycle pump was returned to the catalyst containing reactor tube. Water was removed from the recycling nitrogen-hydrogen gas mixture by means of the condenser and product tank, and when the formation of water had virtually stopped, the system was cooled to about 32° C. while maintaining recycling hydrogen flow. When the catalyst bed had reached this temperature, the system was purged with nitrogen. The reduced catalyst bed was then partially reoxidized by adding a small quantity of oxygen with the nitrogen. During the reoxidation step the temperature of the bed was maintained below about 57° C. by adjusting the amount of oxygen present in the recycling oxygen-nitrogen mixture. The portion of the bed being reoxidized was readily determined by observing the peak temperature by means of a sliding thermocouple inserted in a small tube located in the center of the bed and extending along the entire axis of the cylindrical catalyst bed. When the peak temperature reached the bottom of the reactor, the stabilization was considered completed. After stabilization, the system was flushed with air to atmospheric conditions and the specially prepared catalyst removed therefrom. In this form, the catalyst contained about 60% nickel with the weight ratio of reduced nickel to total nickel of about 55:100.

Example 2

Nickel catalyst prepared and stabilized as in Example 1 (2200 parts) was charged to a jacketed 1.3" inside diameter (I.D.) steel reactor tube included in a hermetically joined cyclic system comprising a recycle compressor, flow meter, vaporizer, reactor tube, condenser, and product tank. The cyclic system was fitted with an analytical instrument especially adapted for determining the molecular weight of the recycled gas. The resulting cylindrical catalyst bed was heated by means of circulating oil in the jacket surrounding the reactor column. The gas in the entire system was purged with nitrogen gas. The catalyst bed was heated to 140° C. by means of the circulating oil in the reactor jacket. The catalyst was reduced by passing pure hydrogen down through the column starting at about 140° C. Over a period of about 4 hours the temperature of the recirculating oil was gradually raised to about 200° C. and held there until no further water was recovered from the recycling gas stream by the cold water-cooled condenser. Thereupon, additional hydrogen and ammonia gas were forced into the recycling gas stream until the pressure of the gas at the catalyst bed was approximately 46 pounds per square inch gauge (p.s.i.g.). The ammonia gas and hydrogen gas were introduced into the system in such a way as to provide a recycling gas having a molecular weight of about 12. The recycled gas, therefore, was approximately 65 mole percent ammonia. Cyclohexanone was pumped into the vaporizer which was maintained at a temperature of 210° C. at the rate of 663 parts of cyclohexanone per hour. The recycling gas flow rate was adjusted to provide 44 moles of gas per mole of cyclohexanone fed and the hydrogen and ammonia make-up were adjusted to maintain approximately 46 pounds of pressure on the system and to maintain a molecular weight of about 12 in the recycling gas. The oil circulating in the reactor jacket was maintained at about 200° C. throughout this test. These conditions were maintained for approximately 48 hours at which time a sample of the product was removed for analysis. It was found that the cyclohexanone was 100% converted and that monocyclohexylamine was produced in approximately 81% yield. Dicyclohexylamine was also produced in approximately 10% yield along with cylohexane in 1.3% yield, aniline in 0.7% yield, cyclohexanol in about 1% yield, and benzene in about 7.5% yield. No tricyclohexylamine was found in the product of this run.

Example 3

After the completion of the run described in Example 2, the feed material was changed to a mixture of half cyclohexanol and half cyclohexanone. This mixture was pumped into the vaporizer at the rate of 723 parts of mixture per hour. The pressure of the gas in the reactor was maintained at about 47 p.s.i.g. and the molecular weight of the recycling gas was maintained at about 13. The recycle rate was adjusted to provide approximately 41 moles of gas per mole of feed mixture. The recirculating oil in the jacket of the reactor was maintained at 195° C. After 36 hours of operation, a sample of the product being condensed from the system was analyzed and it was found that the cyclohexanone mixture was undergoing 99% conversion to provide monocyclohexylamine in about 81% yield and dicyclohexylamine in about 10% yield. No tricyclohexylamine was found in the product of this run. About 2% of the cyclohexanol fed was found in this product.

It is observed from Examples 2 and 3 that about 10–11% dicyclohexylamine was being produced in the reaction in accordance with this invention as described in those examples. The following example illustrates a more preferred embodiment of this invention in which the feed contains dicyclohexylamine in an amount substantially equal to the amount appearing in the crude reaction product, and by which formation of additional dicyclohexylamine is substantially reduced.

Example 4

After the run of Example 3 was completed, the cyclohexanol-cyclohexanone feed was modified by admixing therewith sufficient dicyclohexylamine to provide a feed containing about 10% by weight dicyclohexylamine. This modified mixture was pumped to the recycle system vaporizer at the rate of about 680 parts per hour. The gas was recycled at sufficient rate to provide 43 moles of recycled gas per mole of feed in the vaporizer. The hydrogen and ammonia make-up rates were adjusted to provide approximately 46 p.s.i.g. pressure on the system and recycled gas having a molecular weight of 13. The oil circulating in the jacket surrounding the catalyst bed was maintained at about 195° C. After 36 hours of operation, the product coming from the reactor was sampled and it was found after correcting for the dicyclohexylamine introduced with the feed that 99% of the cyclohexanol-cyclohexanone mixture was converted to provide monocyclohexylamine in approximately 91% yield, dicyclohexylamine in 2.8% yield, cyclohexane in about 1.1% yield, benzene in about 4.2% yield, and aniline in about 0.9% yield. No cyclohexanone or tricyclohexylamine was found in the product of this run.

Example 5

After the run of Example 4 was completed, the temperature of the oil circulating in the reactor jacket was lowered to 180° C. and all other operating conditions were maintained the same as in Example 4. After 36 hours of operation under these conditions, the product being condensed out of the system was analyzed and it was found that after correcting for the dicyclohexylamine introduced with the feed mixture that 99% of the cyclohexanol-cyclohexanone mixture had been converted to provide monocyclohexylamine in about 91.5% yield, dicyclohexylamine in 2.8% yield, cyclohexane in about 0.1% yield, benzene in about 2.0% yield, and aniline in about 0.2% yield. No tricyclohexylamine was found in the product of this run.

Example 6

The test of Example 5 was repeated except that the recycle ratio was lowered to 33:1, the temperature was 151° C., and the feed material was cyclohexanone containing no dicyclohexylamine. Analysis of the product of this test indicated that substantially 100% conversion was achieved to provide monocyclohexylamine in 93.8% yield and dicyclohexylamine in 6.6% yield.

Example 7

The test of Example 6 was repeated except that the feed material was cyclohexanone containing about 8% by weight dicyclohexylamine based on the weight of the feed. Analysis of the product of this test indicated that substantially 100% conversion was achieved to provide monocyclohexylamine in 97.5% yield and dicyclohexylamine in 1.9% yield.

Example 8

Nickel catalyst prepared and stabilized as in Example 1 (655 parts) was charged to a ¾" I.D. jacketed steel reactor tube in a system such as that described in Example 2. The catalyst bed was reduced by a procedure such as that described in Example 2, and after the catalyst was reduced, ammonia gas and hydrogen were introduced to the system in such a manner as to provide 46 p.s.i.g. pressure and a recycled gas molecular weight of 13. A feed mixture containing approximately 90% cyclohexanone and 10% dicyclohexylamine was pumped at the rate of 150 parts per hour into the vaporizer which was maintained at 200° C. The oil being circulated in the jacket around the reactor was maintained at 195° C. After 16 hours of operation under these conditions, the product being condensed from the system was sampled, and it was found that after correcting for the dicyclohexylamine added with the feed 100% of the cyclohexanone was converted to provide cyclohexylamine in about 90.5% yield, dicyclohexylamine in about 0.6% yield, cyclohexane in about 0.8% yield, and aniline in about 1.8% yield. No cyclohexanol or tricyclohexylamine was found in the product of this run.

In the above examples numbered 2 through 8 considerable gas evolution or effervescence was encountered upon emptying the pressurized product tank. It is believed that some of the product compounds may have been lost as sweep-out during this degassing step and it is further believed that this is the main reason why the theoretical yields of the above examples did not add up to 100%.

It is clear from the above examples, however, that we have provided a method for producing monocyclohexylamine in improved yields from cyclohexanone. The special nickel catalyst of this invention is found to provide long life when used in accordance with this invention. In beds used for a series of tests in accordance with this invention, such as those of the examples above, no sign of lessening of catalytic activity or build-up of material on the catalyst bed appeared, even though some series were continued until over 100 pounds of feed were contacted per pound of catalyst.

Therefore, we claim:

1. In a method for producing monocyclohexylamine by the reductive amination of cyclohexanone, said method providing a crude product containing dicyclohexylamine, the improvement comprising contacting cyclohexanone with a stoichiometric excess of ammonia and hydrogen in an ammonia-hydrogen gas mixture, said contacting taking place in the presence of a hydrogenation catalyst and also in the presence of dicyclohexylamine, said dicyclohexylamine being present in an amount substantially equal to the amount of dicyclohexylamine contained in crude product, said amount being between about 5% and about 25% by weight of the feed, said contacting taking place at a temperature below about 230° C. and at a pressure between atmospheric pressure and about five atmospheres.

2. A method as in claim 1 in which said pressure is between about two and about five atmospheres.

3. A method as in claim 1 in which the hydrogenation catalyst is a nickel catalyst having been prepared from nickel oxide reduced at a temperature below about 450° C., reoxidized by passing a gas containing free oxygen over the reduced catalyst and again reduced by passing a gas thereover containing free hydrogen at a temperature below about 250° C.

4. In a method for producing monocyclohexylamine by the reductive amination of cyclohexanone, said method providing a crude product containing dicyclohexylamine, the improvement comprising contacting a cyclohexanone-containing feed mixture with a stoichiometric excess of ammonia and hydrogen in an ammonia-hydrogen gas atmosphere, said contacting taking place in the presence of a hydrogenation catalyst, said feed mixture also containing dicyclohexylamine in an amount substantially equal to the dicyclohexylamine present in the crude product, the amount of dicyclohexylamine present in the feed mixture being between about 5% and about 25% by weight based on the weight of the feed, said contacting taking place at the temperature below about 230° C. and at a pressure between about two atmospheres and about five atmospheres.

5. A method as in claim 4 in which the hydrogenation catalyst is a nickel catalyst having been prepared from nickel oxide reduced at a temperature below about 450° C., reoxidized by passing a gas containing free oxygen over the reduced catalyst and again reduced by passing a gas thereover containing free hydrogen at a temperature below about 250° C.

References Cited

UNITED STATES PATENTS 1,762,742 6/1930 Reppe.
1,982,985 12/1934 Ernst et al.

OTHER REFERENCES

Alexander et al., J.A.C.S., vol. 70, 1315 (1948).

CHARLES B. PARKER, *Primary Examiner.*

P. C. IVES, *Assistant Examiner.*

U.S. Cl. X.R.

252—472

UNITED STATES PATENT OFFICE
CERTIFICATE OF CORRECTION

Patent No. 3,415,881                                                          December 10, 1968

Andrew P. Dunlop et al.

It is certified that error appears in the above identified patent and that said Letters Patent are hereby corrected as shown below:

Column 7, line 9, "(655 parts)" should read -- (665 parts) --.

Signed and sealed this 31st day of March 1970.

(SEAL)
Attest:

Edward M. Fletcher, Jr.                          WILLIAM E. SCHUYLER, JR.
Attesting Officer                                       Commissioner of Patents